United States Patent [19]

Hesselbart et al.

[11] 4,351,990
[45] Sep. 28, 1982

[54] INTERPHASE BARRIER FOR SWITCHGEAR

[75] Inventors: Glenn A. Hesselbart, Plum Borough; Robert E. Wobrak, North Huntingdon, both of Pa.

[73] Assignee: Westinghouse Electric Corp., Pittsburgh, Pa.

[21] Appl. No.: 174,340

[22] Filed: Aug. 1, 1980

[51] Int. Cl.$^3$ .............................................. H01H 9/22
[52] U.S. Cl. .............................. 200/50 AA; 331/336
[58] Field of Search ................... 200/50 AA, 304, 305, 200/293, 262; 361/345, 336

[56] References Cited

U.S. PATENT DOCUMENTS 2,689,293  9/1954  Claybourn et al. ............ 200/50 AA
3,614,350  10/1971 Eichelberger et al. ......... 361/345 X
3,691,332  9/1972  Sharp ......................... 200/50 AA X Primary Examiner—Arthur T. Grimley
Assistant Examiner—Morris Ginsburg
Attorney, Agent, or Firm—M. J. Moran

[57] ABSTRACT

Draw-out circuit breaker apparatus is taught with an interphase barrier for metal enclosed switchgear. The interphase barrier includes a unitary member which is mounted on wheels so that it may be partially withdrawn when the circuit interrupter draw-out element is withdrawn thus allowing pivotal shutter members to be moved into position in front of the spouts or bottles of the high voltage terminals of the metal enclosed system. When the movable draw-out element is reinserted in its fully connected position the barrier moves flush with the previously described spouts as the shutters rotate upwardly and downwardly to accommodate insertion of the terminals of the movable circuit breaker into the complementary stationary high voltage terminals.

4 Claims, 6 Drawing Figures

INTERPHASE BARRIER FOR SWITCHGEAR

BACKGROUND OF THE INVENTION

1. Field of the Invention

The subject matter of this invention relates generally to metal clad switchgear and more particularly to electrically insulating interphase barriers for multiphase drawout type switchgear.

2. Description of the Prior Art

Drawout metal-clad switchgear is well known in the art. In particular, a metal enclosure or cabinet has disposed in one portion thereof, usually the rear, high voltage terminations for an electrical system to be protected or served by the switchgear. In the front portion or low voltage portion of the switchgear cabinet, parallel tracks or rails are provided upon which a wheel mounted circuit breaker may be disposed so as to be moved into the cabinet to a disposition of electrical connection with the aforementioned high voltage terminations or out of the cabinet to a disposition of disconnection from the high voltage terminations. Generally, safety interlock means are provided for lowering shutters or the like to a disposition in front of the high voltage terminals when the circuit breaker has been withdrawn. Other interlocking means are provided to perform other safety functions. with the advent of the vacuum circuit interrupter the size of the drawout element became reducible because of the relatively small size of the vacuum circuit interrupter unit. The vacuum circuit interrupter has the property of being able to withstand relatively high voltages between the opened contacts thereof even though the distance between the open contacts is relatively small when compared with other types of circuit interrupters. This is because of the voltage withstand properties of a vacuum. As the size of the circuit interrupter equipment became progressively smaller with advancements in the art it was found that the open circuit voltage breakdown characteristic became more closely associated with the non-interrupter portions of the switchgear than with the interrupter. As a result attempts were made throughout the development of the art to prevent voltage flashover or breakdown in the non-interrupter area of interest. One such development included the use of an interphase insulating barrier system between each of the three phases and ground of a circuit interrupter system. An example is shown in U.S. Pat. No. 3,793,494, issued Feb. 19, 1974 to C. M. Cleveland, entitled "Drawout Type Vacuum Circuit Breaker Assembly With Hinged Barrier." Generally, the vertical and horizontal dimensions of the vertically oriented interphase barriers were adequate relative to the size of the drawout circuit breaker described therein. As the art continued to develop however it was found that the size of the drawout vacuum circuit interrupter could be reduced further by judiciously placing the operating mechanism on an appropriate part of the drawout cart for the vacuum interrupter. In particular, the height of the vacuum circuit interrupter system could be reduced over what was found in the prior art. This meant among other things that two vacuum circuit interrupters could be more easily disposed in tandem, one above the other vertically. In the past the previously described interphase barriers were disposed upon the movable cart and usually represented an extensive vertical expanse relative to the size of the cart. With a reduction in the size of the vacuum circuit interrupter drawout system in the tandem placement one above the other it was found that sufficient vertical clearance could not easily be obtained if the barriers remained upon the cart. Consequently the barriers were stored in the switchgear cabinet. Therefore the barriers became associated with the cabinet rather than the cart. In metal-clad switchgear it has been found that insulating spouts projecting frontwardly from the high voltage section and encircling the high voltage terminals was safe and useful. When the circuit interrupter is withdrawn, shutters deploy in front of the openings of the spouts to protect personnel in the forward portion of the metal-clad switchgear compartment from the high voltage terminals which would otherwise be exposed through the opening in the front of the bottles. If this shutter is to remain in one piece for a three phase circuit interrupter system, as is desired for efficiency and safety, and if the interphase barriers are to protrude sufficiently rearwardly, a problem develops. It has been found that the barriers interfered with the shutter movement and vice versa. It would be advantageous therefore if this interference between the barriers and the shutter could be overcome without otherwise negatively affecting the effectiveness of either or both. Another example of a barrier system may be found in U.S. Pat. No. 2,689,293, issued Sept. 14, 1954 to G. L. Claybourn and A. L. Fletcher in which a barrier is fixedly disposable between conductor members of an electrical system. An example of a vertically translating shutter system may be found in U.S. Pat. No. 4,216,521, filed Jan. 26, 1979 by C. R. Merola and entitled "Composite Groundable Barrier For Switchgear." Pivotal shutter systems may also be found as shown in portions of the drawings of this application. An example of a vacuum drawout circuit interrupter may be found in U.S. Pat. application Ser. No. 060,513, now abandoned, filed July 25, 1979, for F. Bould and entitled "Vacuum Circuit Interrupter With Improved Torque Loading on the Support Insulator." Another reference which may be relevant is U.S. Pat. No. 3,691,332, issued Sept. 12, 1972 to W. T. Sharp, entitled "Vacuum-Type Electrical Switchgear." Another item of interest is a paper entitled "Vacuum Circuit Breaker Metal-Clad Switchgear," written by Stanton H. Telander, Senior Member IEEE, Allis-Chalmers Corporation, Milwaukee, WI, which is copyrighted material of the IEEE and designated Conference Record 75CHOD89-4-1A, Paper No. PCI-75-1.

SUMMARY OF THE INVENTION

In accordance with the invention a circuit interrupter system is taught having a movable circuit interrupter with spaced electrically conductive terminals for interconnection with an electrical circuit which is to be controlled thereby. There is also taught an enclosure for having disposed as part thereof fixed electrically conductive terminals which are complementary with the terminals on the movable circuit interrupter and which are interconnected electrically with the previously described electrical circuit. The enclosure has an opening therein of predetermined magnitude in a given dimension through which the movable circuit interrupter moves to thus cause interconnection of the movable circuit interrupter terminals and the fixed complementary terminals. A shutter is provided which is disposed within the enclosure. The shutter may be alternatively placed to shield the fixed complementary terminals when the terminals of the movable circuit interrupter are not in a disposition of electrical contact therewith or to expose the fixed complementary terminals. There is also provided movable electrically insulating interphase barriers which have a maximum displacement in the previously described dimension which is larger than the predetermined magnitude spoken of. The barriers are movably disposed within the enclosure in a first disposition between the movable spaced terminals when the movable spaced terminals are interconnected with the fixed complementary terminals for thus increasing the voltage breakdown distance between adjacent sets of movable terminals. The barrier is however movable within the enclosure to a second disposition to allow the shutter to be placed in a disposition to shield the fixed complementary terminals when the terminals of the movable circuit interrupter means are not in electrical contact with the fixed terminals.

BRIEF DESCRIPTION OF THE DRAWINGS

For a better understanding of the invention reference may be had to the preferred embodiments thereof shown in the accompanying drawings in which.

DESCRIPTION OF THE PREFERRED EMBODIMENT

Figure 1:
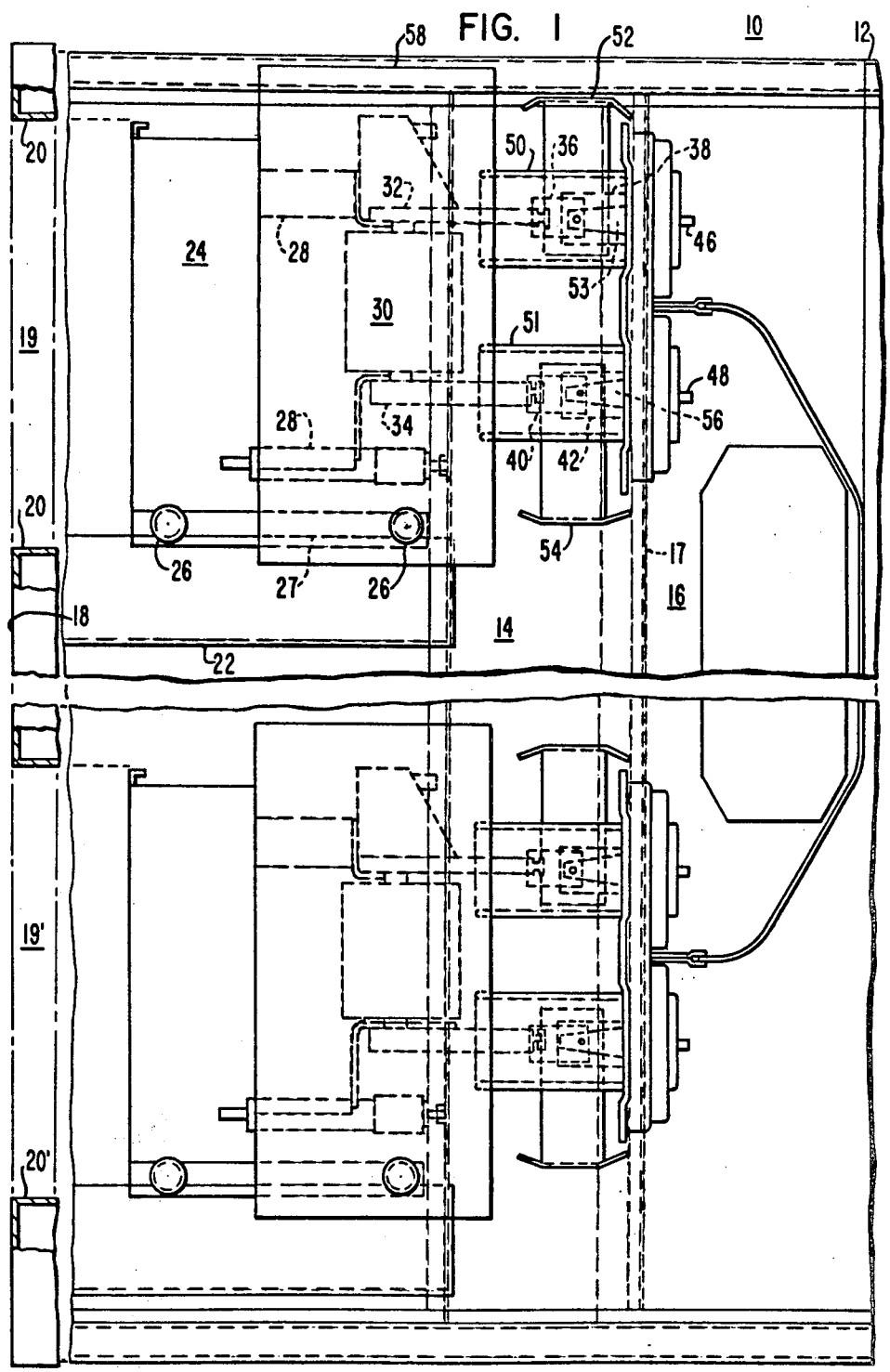
FIG. 1 shows a portion of a metal-clad switchgear cabinet with vertically mounted circuit interrupters. The Figure shows the circuit interrupter system partially broken away and partially in section.

Referring now to the drawings and FIG. 1 in particular, there is shown a metal-clad or metal-enclosed circuit interrupter system 10. In this particular embodiment of the invention the circuit interrupter system is of the type which includes two vertically, tandemly disposed vacuum circuit interrupters. The circuit interrupter system 10 includes an enclosure or cabinet 12 which may be made of electrically conducting plate material of the type that is grounded so as to provide zero ground potential around the high voltage terminations of the electrical system. In this embodiment of the invention the cabinet or enclosure 12 is divided into a low voltage section 14 on the left as viewed in FIG. 1 and a high voltage section 16 on the right. The sections 14 and 16 may be separated by a zero potential electrically conductive plane 17 which also acts as a support member for various other components of the system 10. To the far left as viewed in FIG. 1 there is a front panel 18. In this embodiment of the invention the metal-clad circuit interrupter system 10 is divided into an upper section 19 and a lower section 19' which are essentially duplicates of each other and which represent the tandem disposition of the circuit interrupters. For the purpose of simplicity of illustration the structure and operation of only the top section 19 will be described herein. The front panel 18 has an opening 20 therein associated with the upper section 19 and an opening 20' therein associated with the lower section 19'. The openings 20 and 20' are vertically dimensioned so as to allow the respective circuit breakers to be drawn therethrough. There is provided a set of rails 22 upon which the drawout circuit breaker apparatus 24 may be rollably disposed by way of wheels 26. As viewed in FIG. 1 the circuit breaker apparatus is disposed in its completely connected disposition. In order to disconnect the circuit breaker apparatus 24 it is necessary to move the circuit breaker apparatus to the left as viewed in FIG. 1 by rolling the wheels 26 along the rail 22. Disconnection of the terminals may occur before the circuit breaker is completely withdrawn. However, it is possible to completely withdraw the circuit breaker and remove it from the rails 22. There are provided two vertically spaced support insulators 28 between which may be supported a vacuum circuit interrupter 30. The vacuum circuit interrupter 30 may have an upper terminal extension 32 and a lower terminal extension 34. To the right of the upper terminal extension 32 as viewed in FIG. 1 is a connecting terminal means 36 which is complementary with a fixed terminal 38 disposed supportively on the panel 17. Interconnected with the lower terminal extension 34 is a terminal 40 which may be interconnected with a complementary terminal 42 which is also supported on the panel 17. Connected to the other end of the complementary terminal 38 is a high voltage terminal 46. Connected to the other end of the complementary terminal 42 is a high voltage terminal 48. The high voltage terminals 46 and 48 which are disposed in the high voltage compartment 16 are typically connected to an external circuit which is to be controlled or served by the circuit breaker apparatus 24. Protruding outwardly and radially about the terminals 38 and 42 are cylindrical insulating spouts or bottles 50 and 51, respectively. These spouts or bottles encircle the interconnection of the terminal 36 with the terminal 38 and the terminal 40 with the terminal 42 when the circuit breaker is in its completely drawn or connected disposition. The spouts or bottles 50 and 51 act as safety shrouds for those high voltage terminals 38 and 42 respectively, which are disposed in the low voltage portion 14 of the cabinet or enclosure 12. The bottles or spouts therefore have a tendency to restrict the availability of the terminals 38 and 42 from inadvertent contact by personnel or conductive apparatus in the low voltage compartment 14. A shutter 52 is pivotally disposed on a support means 53 so that the shutter 52 may be rotated to the left and downwardly to cover the left opening of the bottle 50 as viewed in FIG. 1. Likewise a pivotal shutter 54 is disposed on support member 56 so that it may rotate upwardly and to the left as shown in FIG. 1 to cover the opening in the spout 51. In FIG. 1 the shutters 52 and 54 have been rotated upwardly and downwardly respectively, to clear the front openings of the bottles 50 and 51 so that circuit interrupter conductors 32 and 34 may extend therethrough for interconnection with the high voltage terminals 38 and 42. There is provided an interphase barrier 58 which has sufficient vertical extension so as to create a restructure voltage strike-over distance between poles or phases of the circuit interrupters. The barrier 58 is movable from left to right in FIG. 1 on wheels 66. The barrier 58 may horizontally overlap the regions of the bottles 50 and 51 to insure that the voltage strike-over distance in a horizontal direction is sufficient to withstand strikeover between phases. It is to be understood that it is expected that three circuit interrupters 24, for example, are mounted at the same height within the same cabinet in a three phase disposition, thus necessitating at least two vertical sheaths of insulating material between the three phases. Furthermore, side sheets may also be provided to protect the end phases from flashover to the side walls of the metal enclosure or cabinet 12.

Figure 2:
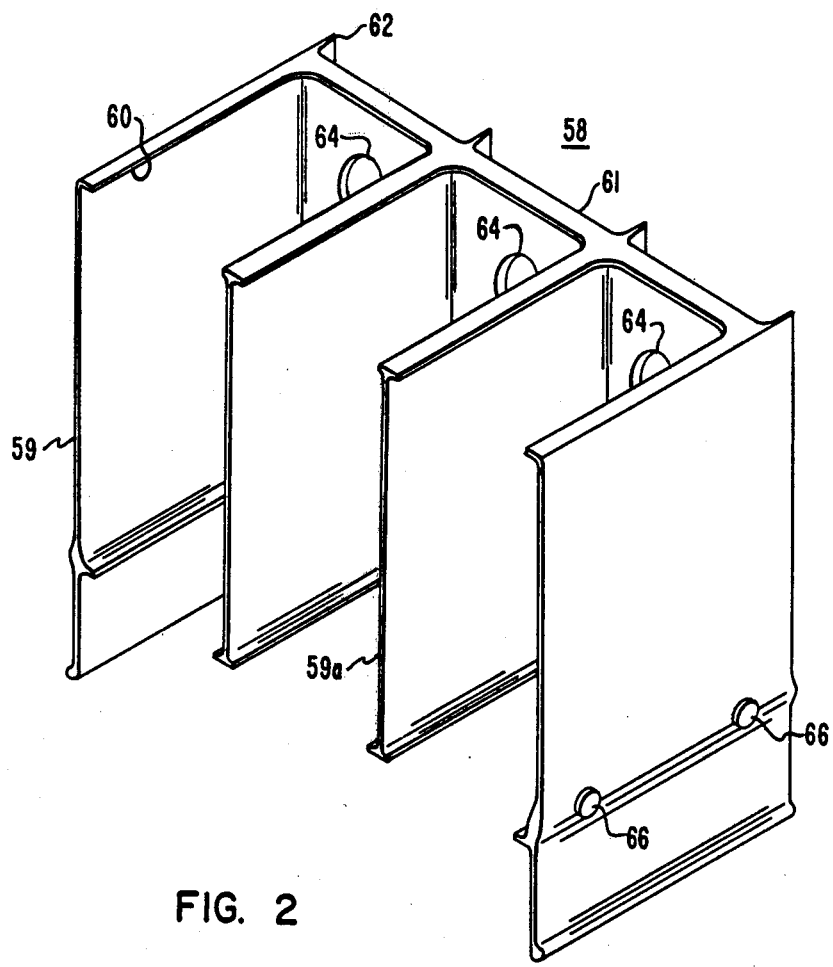
FIG. 2 shows an orthogonal view of a multiphase interphase barrier for circuit interrupter apparatus such as is shown in FIG. 1.

Referring now to FIG. 2 the barrier member 58 is shown in greater detail. Barrier member 58 in this embodiment of the invention comprises four spaced vertical insulating sheets 59 having an upper lip 60 which protrudes therearound and which assist in preventing voltage flashover across the top of each member. Furthermore, a rear vertical sheet 61 of insulating material is provided to support the vertical sheets 59 and to provide extra insulation between the regions of high voltage terminals, such as 38 and 42 as shown in FIG. 1, and apparatus disposed near the other side of the plate 61. Ribs 62 may protrude rearwardly so as to provide an extra overlap of electrical insulating material between the front edges of the bottles 50 and 51, for example, as shown in FIG. 1. Holes or openings 64 are provided so that the terminal extensions 32 and 34, for example as shown in FIG. 1, may protrude therethrough for insertion into the bottles or spouts 50 and 51 in a manner previously described. Wheels or rollers 66 are provided for allowing the member 58 to roll through a relatively small distance along a track for purposes to be described hereinafter.

Figure 3:
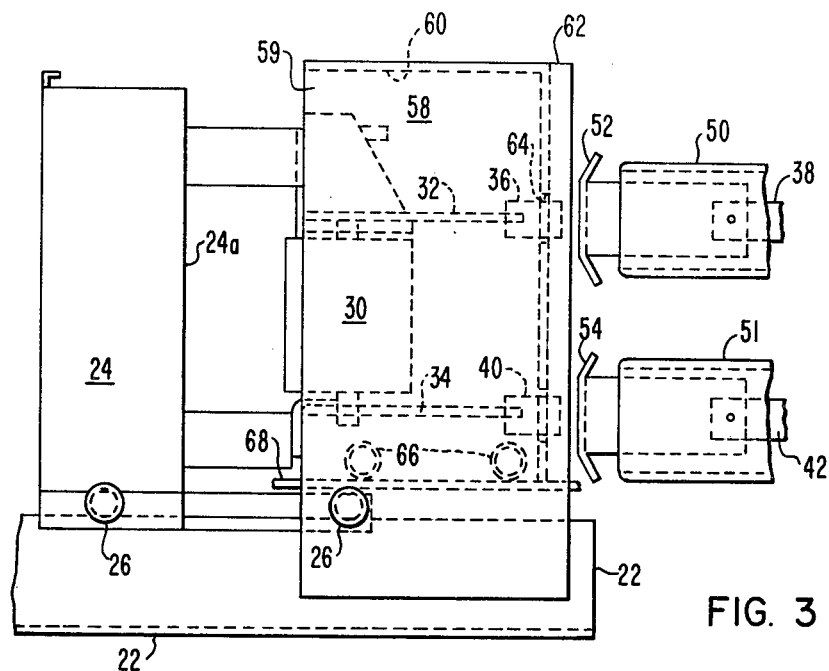
FIG. 3 shows a circuit interrupter and barrier system similar to that shown in FIG. 1 with the circuit interrupter in a partially drawn-out disposition.

Referring now to FIG. 3 the circuit apparatus associated with the circuit breaker and the bottles and terminals described previously with respect to FIG. 1 is described here in greater detail with respect to the operation of the movable barrier 58. The barrier 58 is rollably disposed upon a track 68 so that the barrier may translate from left to right as shown in FIG. 3. In a preferred embodiment of the invention the amount of travel may be 3½ to 4 inches. This allows the shutters 52 and 54 to be raised and lowered in front of the openings in the spouts or bottles 50 and 51, respectively. In the embodiment shown in FIG. 3 the circuit breaker system 24 is shown in a withdrawn but not fully drawn-out state. This is accomplished by moving the draw-out circuit breaker apparatus 24 along the rail 22 on wheels 26 in a right to left direction as shown in FIG. 3. As the circuit breaker apparatus 24 withdraws interlinking mechanisms (not shown) which are interconnected with the shutters 52 and 54 force those shutters to pivot or rotate downwardly and upperwardly respectively so that the shutters push the barrier member 58 away from the fronts of the bottles 50 and 51 as the shutters take their horizontal safety position in front of those bottles or spouts.

Figure 4:
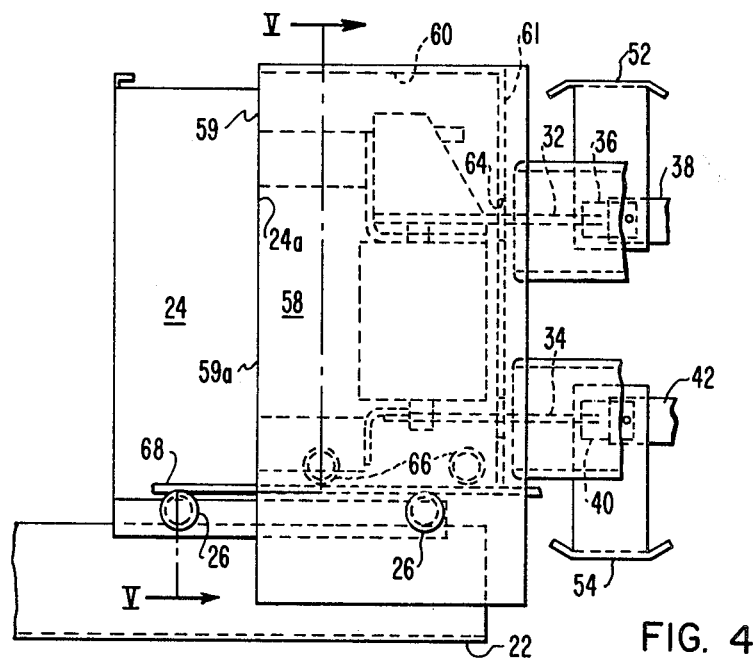
FIG. 4 shows the apparatus of FIG. 3 in the drawn-in disposition.

Referring now to FIG. 4, the circuit breaker apparatus of FIG. 3 is shown in the connected disposition in which case the terminals extensions 32 and 34 have fully extended through the openings 64 in the barrier member 58 in the left to right direction as shown in FIG. 4 so that electrical contact is made between the complementary terminals 36 and 38 on the upper terminal assembly and 40 and 42 on the lower terminal assembly. As this happens the previously mentioned linkage mechanism causes the shutters 52 and 54 to rotate upwardly and downwardly respectively thus allowing the barrier member 58 to be rolled to the right on the rail 68. The force for accomplishing this is provided by having a portion 24a of the circuit breaker apparatus 24 abut against a forward portion 59a of the barrier 58 so as to force the barrier 58 to the right as is shown in FIG. 4.

Figure 5:
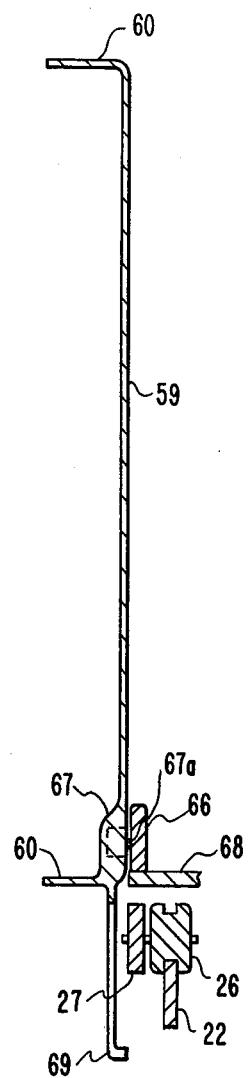
FIG. 5 shows a sectional view of that portion of the apparatus of FIG. 4 represented by the section lines V—V.

Referring now to FIG. 5 a section of the apparatus of FIG. 4 is shown to help illustrate the interrelationship between movement of the barrier 58 and the circuit breaker apparatus 24. A vertical side wall 59 of the barrier 58 is shown partially in section. There is provided here on a lower portion of the vertical side wall 59 as shown in the figure, an enlarged portion 67 which suppprts an axle 67a upon which the wheel 66 is disposed. One of the reinforcing lips 60 is shown on the bottom of wall 59 in the region of the protrusion 67 and one of the lips 60 as shown at the top of the wall 59. Extending further downwardly from the protrusion 67 is a portion of the wall 59 which terminates in an outwardly disposed lip member 69. Shown adjacent to this and to the right as viewed in FIG. 1 is the foot plate 27 of the circuit breaker apparatus 24. The previously described wheels 26 are disposed on axles protruding from the foot plate 27 and rest upon the plate member or rail 22 in a manner described previously. The wheel members 66 rest upon a horizontally extending protrusion 68 in a manner described previously. The mechanical interconnection of the various members 68 and 22 will be described hereinafter in more detail with respect to FIG. 6.

Figure 6:
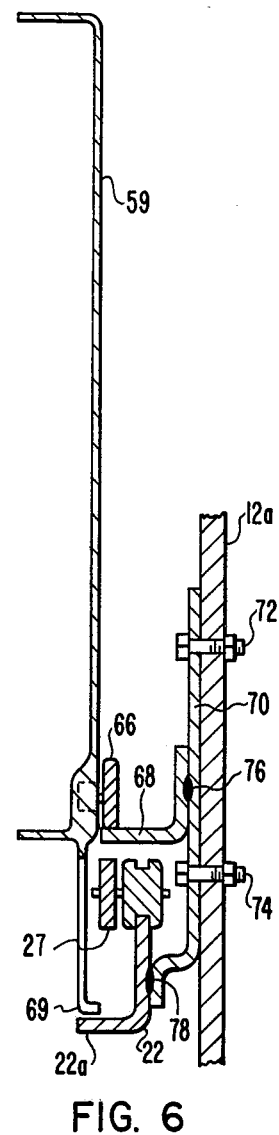
FIG. 6 shows an arrangement similar to that shown in FIG. 5 but with the addition of the side panel of the metal-clad switchgear and the support members for the various portions depicted in FIG. 5.

Referring now to FIG. 6 the apparatus of FIG. 5 is shown with appropriate mechanical interconnection with a wall member 12a of the enclosure 12. In this case a support member 70 is bolted to wall member 12a by way of bolt members 72 and 74. Welded to support member 70 is a flange 76 which is terminated in the horizontal support track 68 as described previously. The track member 22 is welded at 78 to a bottom portion of the support member 70. Furthermore, a horizontal extension 22a of the track member 22 is provided for cooperation with the protruding lip member 69 of the member 59 for increased isolation or protection of the various wheel members and electrically conducting members 66, 68, 27 etc. from the high voltage terminals of the circuit breaker apparatus.

Referring once again to FIG. 3 and FIG. 1, it can be seen that the maximum vertical extension of the barrier member 58 is larger than the opening 20. This necessitates the installment of the barrier 58 in the circuit enclosure 12 rather than on the wheeled cart of the circuit interrupter system 24. If the barrier 58 were installed on the wheeled cart of the circuit interrupter 24, there would be insufficient vertical clearance to allow the cart 24 to be withdrawn completely to the left as viewed in FIG. 1 as the front edge of the barrier member 58 would strike against the inside portion of the front panels 18 during withdrawal.

It is to be understood with respect to the embodiments of the invention that it is not limited to vertically, tandemly disposed circuit breaker apparatus nor to circuit breaker apparatus exclusively. It is also to be understood that the interphase barrier concept may be utilized with a two-phase or other polyphase side-by-side disposed arrangement.

The apparatus taught with respect to the embodiments of this invention has many advantages. One advantage lies in the fact that the barrier 58 is mounted in the housing or enclosure 12 as opposed to being mounted upon the draw-out element 24. This improves the maintainability of the draw-out element by improving accessibility. It also reduces the weight of the draw-out element. As was mentioned previously this also eliminates the interference of the relatively large barrier with the inside portion of the front panel of the circuit interrupter system during draw-out or draw-in operations. Another advantage lies in the fact that the barrier system provides an improved personal safety shield when the draw-out element is removed from the housing. Traditional metal shutter systems have a stationary polyester barrier to restrict accidental access to areas not protected by the metal shutter itself. The back portion of the barrier performs that function by itself. In a preferred embodiment of the invention the legs of the barrier system extend forward to provide approximately 14 inches of additional safety margin against accidental access with the primary contacts or terminals. Another advantage lies in the fact that during insertion or withdrawal of the draw-out element the barrier system moves approximately 3½ to 4 inches. This improves BIL (Basic Insulation Level) Protection over a traditional interphase stationary barrier system by virtue of its one-piece construction and more complete shielding characteristics. This also allows the draw-out element compartment to be shallower than a compartment with the traditional barrier by allowing the barrier system to move into the sweep volume of the metal shutters when the shutters are raised.

What we claim is:

1. A circuit interrupter system, comprising:
   (a) movable circuit interrupter means having spaced electrically conductive terminals for interconnection with an electrical circuit which is to be served thereby;
   (b) enclosure means for having disposed as part thereof fixed electrically conductive terminals which are complementary with said movable circuit interrupter means terminals, said fixed electrically conductive terminals being interconnectable with said electrical circuit, said enclosure means having an opening therein or predetermined magnitude in a given dimension through which said movable circuit interrupter means moves for removal thereof from said enclosure means;
   (c) shutter means disposed within said enclosure means for being alternatively placed to shield said fixed complementary terminals when said terminals of said movable circuit interrupter means are not in electrical contact with said fixed terminals or placed to expose said fixed complementary terminals when said terminals of said movable circuit interrupter means approach a disposition of electrical contact with said fixed terminals; and
   (d) movable electrically insulating barrier means having a maximum displacement in said dimension which is larger than said predetermined magnitude, the difference in displacement between said predetermined magnitude and said maximum displacement providing a related incremental increase in the voltage breakdown characteristic of said barrier means, said barrier means being movably disposed within said enclosure means to a first disposition between said movable spaced terminals when said movable spaced terminals are interconnected with said fixed complementary terminals for thus increasing the voltage breakdown distance between said movable terminals, said barrier means being movably disposed within said enclosure means to a second disposition when said circuit interrupter means is removed from said enclosure means for allowing said shutter means to be disposed to shield said fixed complementary terminals.

2. A circuit interrupter system, comprising:
   (a) movable circuit interrupter means having spaced electrically conductive terminals for interconnection with an electrical circuit which is to be served thereby;
   (b) enclosure means for having disposed as part thereof fixed electrically conductive terminals which are complementary with said movable circuit interrupter means terminals, said fixed electrically conductive terminals being interconnectable with said electrical circuit, said enclosure means having an opening therein of predetermined magnitude in the vertical dimension through which said movable circuit interrupter means horizontally moves in a first direction to cause interconnection of said movable circuit interrupter means terminals and said fixed complementary terminals and in the opposite direction to remove said circuit interrupter means from said enclosure means;
   (c) shutter means disposed within said enclosure means for being alternatively placed to shield said fixed complementary terminals when said terminals of said movable circuit interrupter means are not in electrical contact with said fixed terminals or placed to expose said fixed complementary terminals when said terminals of said movable circuit interrupter means approach a disposition of electrical contact with said fixed terminals; and
   (d) movable electrically insulating barrier means having a maximum vertical displacement which is larger than said predetermined magnitude the difference in displacement between said predetermined magnitude and said maximum displacement providing a related incremental increase in the voltage breakdown characteristic of said barrier means, said barrier means being movably disposed within said enclosure means to a first disposition between said movable spaced terminals when said movable spaced terminals are interconnected with said fixed complementary terminals for thus increasing the voltage breakdown distance between said movable terminals, said barrier means being movably disposed within said enclosure means to a second disposition when said circuit interrupter means is removed from said enclosure means for allowing said shutter means to be disposed to shield said fixed complementary terminals.

3. A circuit interrupter system, comprising:
   (a) movable circuit interrupter means having spaced electrically conductive terminals for interconnection with an electrical circuit which is to be served thereby;
   (b) enclosure means for having disposed as part thereof fixed electrically conductive terminals which are complementary with said movable circuit interrupter means terminals, said fixed electrically conductive terminals being interconnectable with said electrical circuit, said enclosure means having an opening therein which extends to a predetermined position in a given dimension and through which said movable circuit interrupter means moves in a first direction to cause interconnection of said movable circuit interrupter means terminals and said fixed complementary terminals and in the opposite direction to remove said circuit interrupter means from said enclosure means;

(c) shutter means disposed within said enclosure means for being alternatively placed to shield said fixed complementary terminals when said terminals of said movable circuit interrupter means are not in electrical contact with said fixed terminals or placed to expose said fixed complementary terminals when said terminals of said movable circuit interrupter means approach a disposition of electrical contact with said fixed terminals; and (d) movable electrically insulating barrier means a portion of which extends beyond said predetermined position in said dimension, said portion providing a related incremental increase in the voltage breakdown characteristic of said barrier means, said barrier means being movably disposed within said enclosure means to a first disposition between said movable spaced terminals when said movable spaced terminals are interconnected with said fixed complementary terminals for thus increasing the voltage breakdown distance between said movable terminals, said barrier means being movably disposed within said enclosure means to a second disposition when said circuit interrupter means is removed from said enclosure means for allowing said shutter means to be disposed to shield said fixed complementary terminals.

4. A circuit interrupter system, comprising:

(a) movable circuit interrupter means having spaced electrically conductive terminals for interconnection with an electrical circuit which is to be served thereby;

(b) enclosure means for having disposed as part thereof fixed electrically conductive terminals which are complementary with said movable circuit interrupter means terminals, said fixed electrically conductive terminals being interconnectable with said electrical circuit, said enclosure means having an opening therein which extends vertically to a predetermined position and through which said movable circuit interrupter means moves in a first direction to cause interconnection of said movable circuit interrupter means terminals and said fixed complementary terminals and in the opposite direction to remove said circuit interrupter means from said enclosure means;

(c) shutter means disposed within said enclosure means for being alternatively placed to shield said fixed complementary terminals when said terminals of said movable circuit interrupter means are not in electrical contact with said fixed terminals or placed to expose said fixed complementary terminals when said terminals of said movable circuit interrupter means approach a disposition of electrical contact with said fixed terminals; and (d) movable electrically insulating barrier means a portion of which extends vertically beyond said predetermined position, said portion providing a related incremental increase in the voltage breakdown characteristic of said barrier means, said barrier means being movably disposed within said enclosure means to a first disposition between said movable spaced terminals when said movable spaced terminals are interconnected with said fixed complementary terminals for thus increasing the voltage breakdown distance between said movable terminals, said barrier means being movably disposed within said enclosure means to a second disposition when said circuit interrupter means is removed from said enclosure means for allowing said shutter means to be disposed to shield said fixed complementary terminals.

* * * * *